(12) United States Patent
Sun et al.

(10) Patent No.: US 11,966,338 B2
(45) Date of Patent: Apr. 23, 2024

(54) PREFETCHING MANAGEMENT IN DATABASE SYSTEM BASED ON NUMBER OF PAGES BEING PREFETCHED

(71) Applicant: INTERNATIONAL BUSINESS MACHINES CORPORATION, Armonk, NY (US)

(72) Inventors: Sheng Yan Sun, Beijing (CN); Xiaobo Wang, Beijing (CN); Shuo Li, Beijing (CN); Chun Lei Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/813,339

(22) Filed: Jul. 19, 2022

(65) Prior Publication Data
US 2024/0028515 A1 Jan. 25, 2024

(51) Int. Cl.
*G06F 12/0862* (2016.01)

(52) U.S. Cl.
CPC .... *G06F 12/0862* (2013.01); *G06F 2212/602* (2013.01); *G06F 2212/6026* (2013.01)

(58) Field of Classification Search
CPC ........... G06F 12/0862; G06F 2212/602; G06F 2212/6026
See application file for complete search history.

(56) References Cited

U.S. PATENT DOCUMENTS

| | | | |
|---|---|---|---|
| 5,983,324 A * | 11/1999 | Ukai | G06F 12/0862 |
| | | | 711/E12.075 |
| 7,383,391 B2 | 6/2008 | Davis | |
| 10,621,100 B1 * | 4/2020 | Meier | G06F 12/0862 |
| 2003/0070043 A1 * | 4/2003 | Merkey | G06F 11/1076 |
| | | | 711/114 |
| 2005/0203863 A1 * | 9/2005 | Idei | G06F 16/2453 |
| 2006/0212658 A1 | 9/2006 | Hrle | |
| 2007/0067382 A1 * | 3/2007 | Sun | G06F 12/0862 |
| | | | 711/E12.057 |
| 2011/0320415 A1 | 12/2011 | Berger | |
| 2013/0060781 A1 | 3/2013 | Lyle | |

(Continued)

FOREIGN PATENT DOCUMENTS

CN 114461590 A 5/2022

OTHER PUBLICATIONS

Anonymous, "DB2 Dynamic Prefetch basics," db2-dba.net [article], [accessed on Aug. 30, 2021], 4 pages, Retrieved from the Internet: <URL: http://www.db2-dba.net/articles/Article-Dynamic%20Prefetch.html>.

(Continued)

*Primary Examiner* — Chie Yew
(74) *Attorney, Agent, or Firm* — Daniel J Blabolil

(57) ABSTRACT

This disclosure provides a method, a computing system, and a computer program product for managing prefetching of pages in a database system. The method comprises obtaining shared information associated with page access, wherein the shared information associated with the page access includes information associated with the page access from a plurality of computing nodes. The method further comprises determining whether to prefetch a number of pages into a global buffer pool based at least on the shared information associated with the page access using a sequential prefetching method.

15 Claims, 9 Drawing Sheets

(56) References Cited

U.S. PATENT DOCUMENTS

| | | | |
|---|---|---|---|
| 2017/0277460 A1* | 9/2017 | Li | G06F 1/3275 |
| 2019/0087341 A1* | 3/2019 | Pugsley | G06F 12/0811 |
| 2022/0261349 A1* | 8/2022 | Kim | G06F 12/0868 |

OTHER PUBLICATIONS

Anonymous, "Dynamic Prefetch and Sequential Detection," Ftpdocs.broadcom.com [online], [accessed on May 31, 2022], 1 page, Retrieved from the Internet: <URL: https://ftpdocs.broadcom.com/cadocs/0/CA%20Chorus%20for%20DB2%20Database%20Management%204%200-ENU/Bookshelf_Files/HTML/Performance%20Handbook%20for%20DB2/Dynamic_Prefetch_and_Sequential_Detection.html>.

Chen, et al., "Improving index performance through prefetching," SIGMOD '01: Proceedings of the 2001 ACM SIGMOD international conference on Management of data [article], May 2001, 12 pages, Retrieved from the Internet: <URL: https://dl.acm.org/doi/10.1145/375663.375688>.

IBM, "Prefetching data into the buffer pool," IBM.com [online], [accessed on May 31, 2022], 4 pages, Retrieving from the Internet: <URL: https://www.ibm.com/docs/en/db2/11.1?topic=management-prefetching-data-into-buffer-pool>.

IBM, "Sequential prefetching," IBM.com [online], [accessed on May 31, 2022], 4 pages, Retrieved from the Internet: <URL: https://www.ibm.com/docs/en/db2/11.1?topic=pool-sequential-prefetching>.

Mell, et al., "The NIST Definition of Cloud Computing", National Institute of Standards and Technology, Special Publication 800-145, Sep. 2011, 7 pages.

Soundararajan, et al., "Context-Aware Prefetching at the Storage Server," Usenix.org [online], [accessed on May 31, 2022], 23 pages, Retrieved from the Internet: <URL: https://www.usenix.org/legacy/event/usenix08/tech/full_papers/soundararajan/soundararajan_html/index.html>.

* cited by examiner

PREFETCHING MANAGEMENT IN DATABASE SYSTEM BASED ON NUMBER OF PAGES BEING PREFETCHED

BACKGROUND

The present disclosure relates to database systems, and more specifically, to prefetching management in a database system.

Typically, a database system stores its data in a storage device, e.g., a non-volatile storage device, such as a magnetic disk or an optical disk. The data is generally organized in pages, each of which is given a unique identifier. A page is a fixed-size block of data, which can contain tuples, metadata, indexes, and the like. However, reading/writing data from/to the storage device usually takes a much longer time than accessing data in memory. In-memory databases have been developed, but their capacity is quite limited. The database system generally manages a buffer pool in the memory. When an application of a client requests a certain data page, the database system will first check whether the data page is cached in the buffer pool. If the data page exists in the buffer pool, it will be returned to the application; otherwise, the data page will be obtained from the storage device and a copy of the data page will be stored in the buffer pool and returned to the application.

Prefetching is a process where data pages are retrieved from the storage device into the memory before they are requested by a client. Therefore, prefetching can reduce input/output (I/O) time by making data pages available in the memory before they are requested or needed. However, if the prefetched data pages are eventually not requested by the client, there will be a waste of resources since the prefetching incurs I/O and computing overhead. Thus, it is necessary to manage prefetching of pages in a database system.

SUMMARY

Disclosed herein are embodiments of a method, system and computer program product for managing prefetching of pages in a database system.

According to an embodiment of the present disclosure, a computer-implemented method is provided. The method comprises obtaining shared information associated with page access, wherein the shared information associated with page access includes information associated with page access from a plurality of computing nodes. The method further comprises determining whether to prefetch a number of pages into a global buffer pool based at least on the shared information associated with page access using a sequential prefetching method.

According to another embodiment of the present disclosure, a computing system is provided. The computing system comprises a processor and a computer-readable memory unit coupled to the processor. The memory unit comprises instructions that, when executed by the processor, perform actions of obtaining shared information associated with page access, wherein the shared information associated with page access includes information associated with page access from a plurality of computing nodes. The memory unit further comprises instructions that, when executed by the processor, perform actions of determining whether to prefetch a number of pages into a global buffer pool based at least on the shared information associated with page access using a sequential prefetching method.

According to a further embodiment of the present disclosure, a computer program product is provided. The computer program product comprises a computer readable storage medium having program instructions embodied therewith. The program instructions are executable by a computer and induce the computer to perform actions of obtaining shared information associated with page access, wherein the shared information associated with page access includes information associated with page access from a plurality of computing nodes. The program instructions are executable by a computer and further induce the computer to perform actions of determining whether to prefetch a number of pages into a global buffer pool based at least on the shared information associated with page access using a sequential prefetching method.

According to embodiments of the present disclosure, by utilizing global page access information, prefetching of pages may be managed in a more precise and efficient manner, and database performance may be improved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Figure 1:
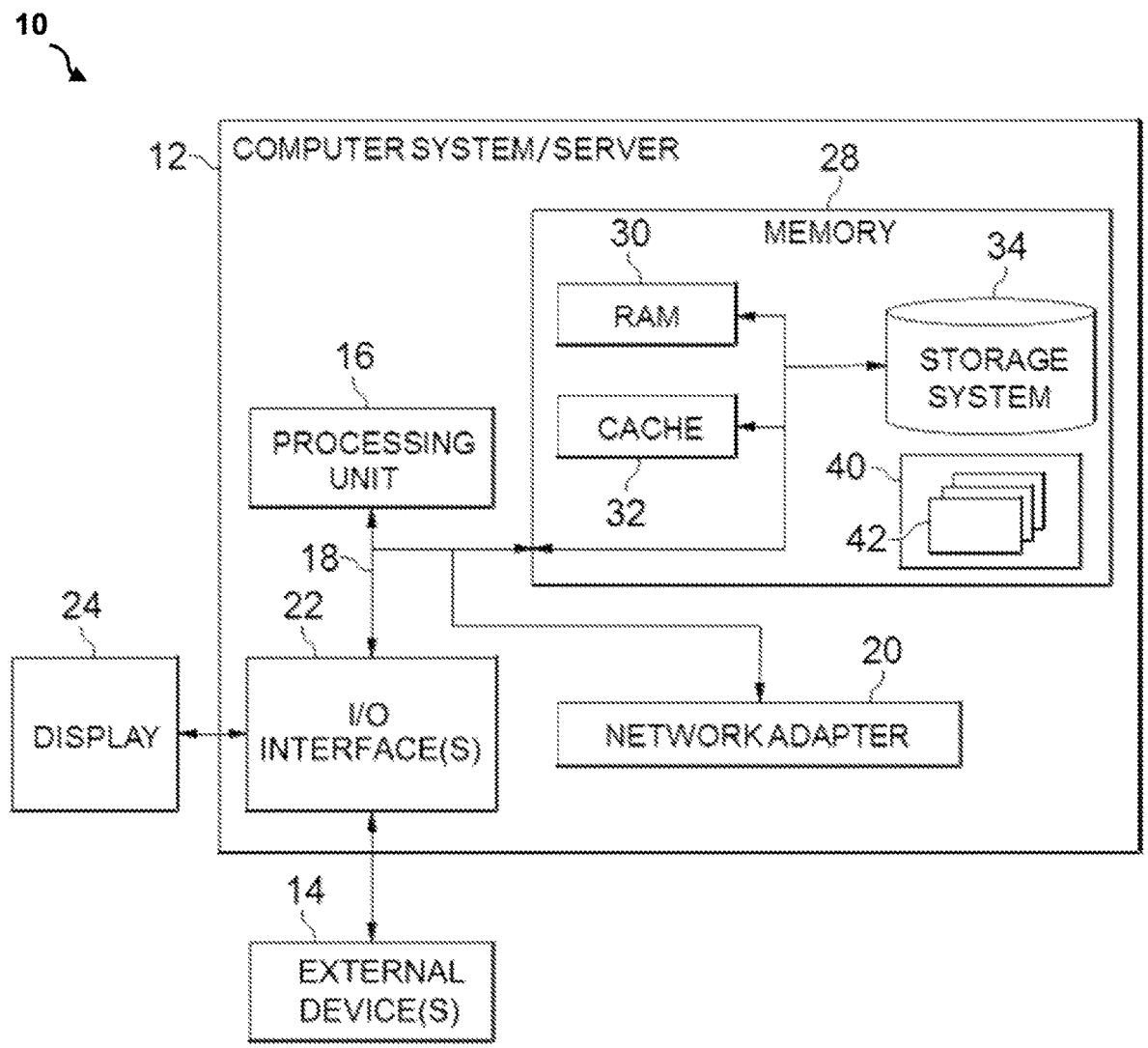
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitations as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processors 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
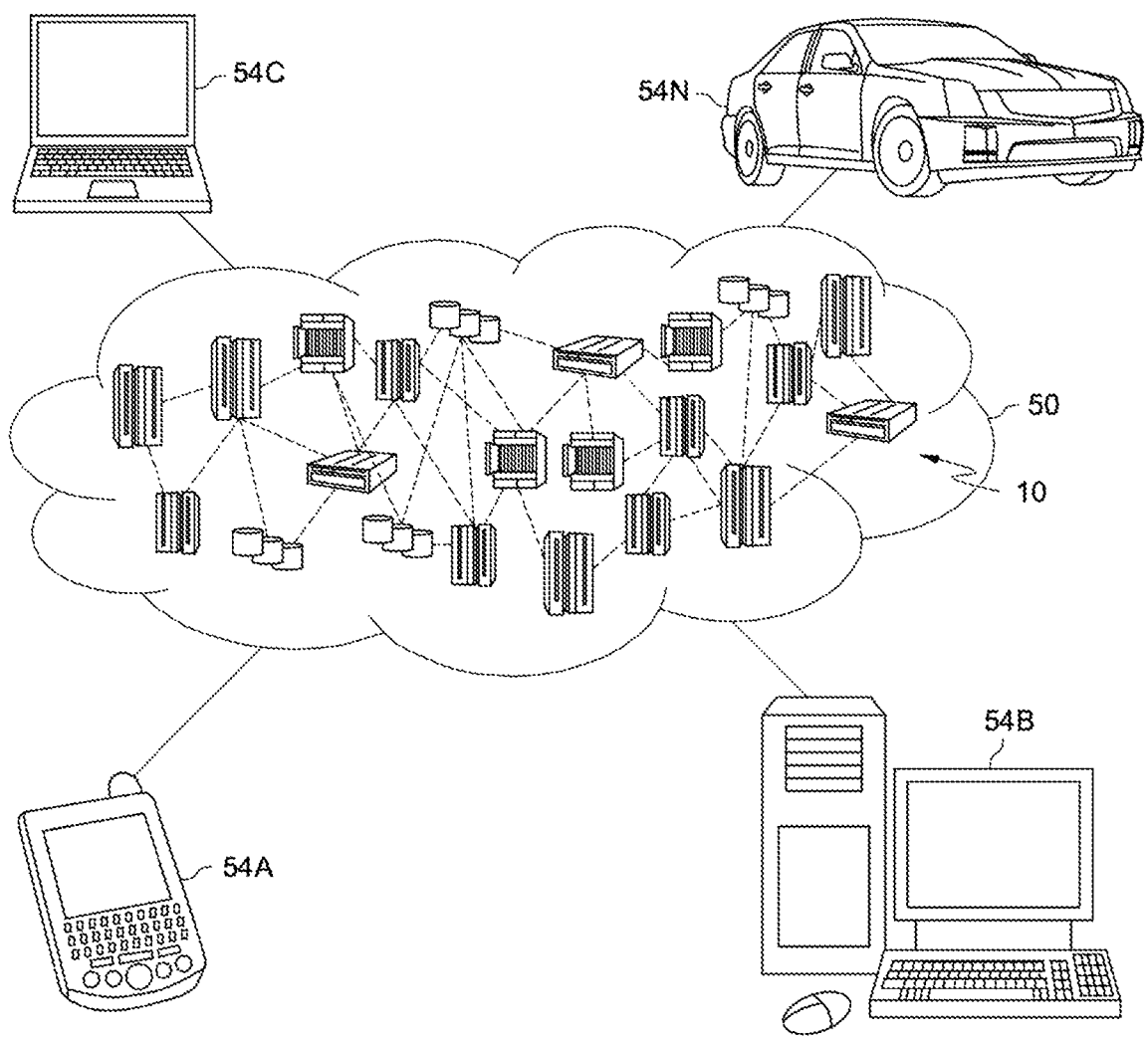
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
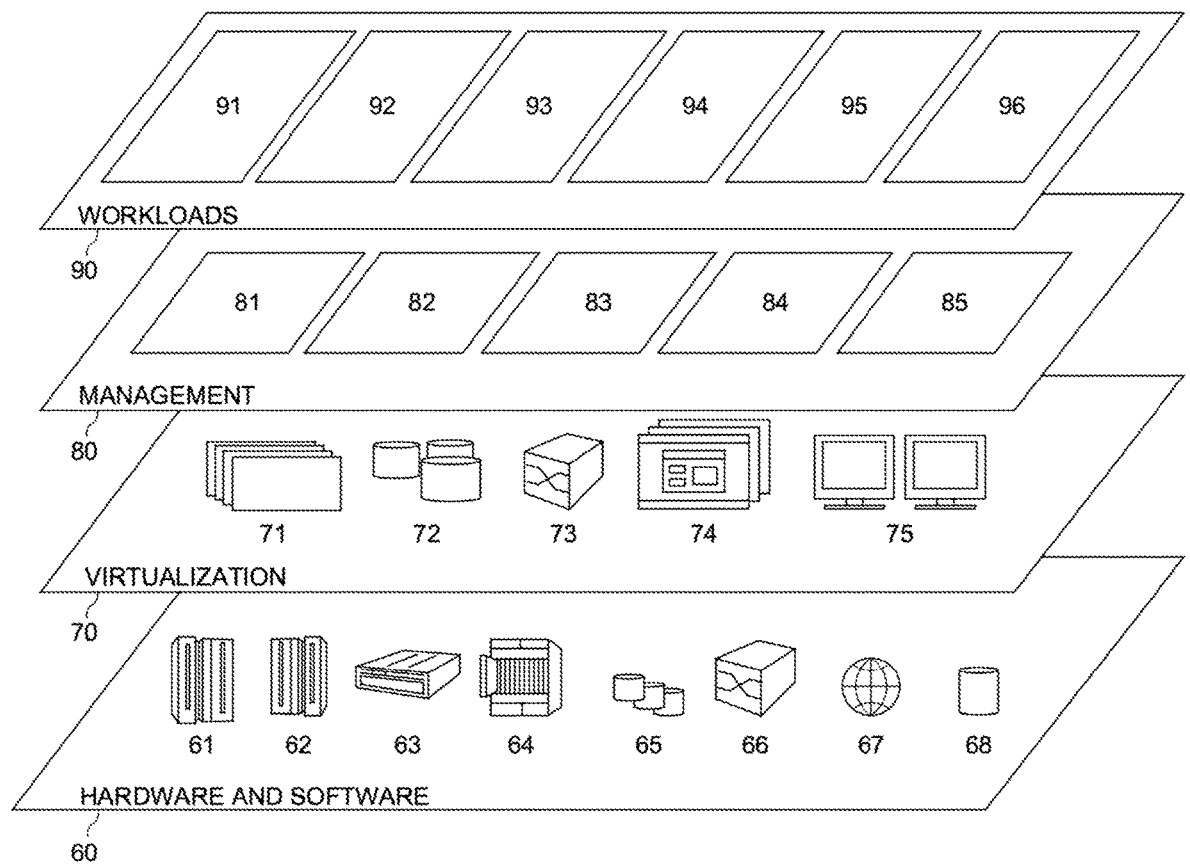
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prefetching management 96.

To improve efficiency, a database system can guess the page a client is going to ask for, prefetch it and keep it ready in the buffer pool even before the client requests it. If one of the prefetched pages is requested afterward by the client, the access time can be greatly reduced compared with the access time in the case that the page had to be read from a storage device. However, prefetching may also bring about unnecessary 110 by reading pages that will not be used subsequently into the buffer pool. In addition, the current prefetching mechanisms only take local page access information into account and do not make decisions on prefetching based on information from other computing nodes (e.g., servers or virtual machines) accessing the same database. Therefore, the global page access information may not be fully utilized to enhance database performance by prefetching.

Therefore, there is a need for a solution for managing prefetching of pages in a database system in a more precise and efficient manner.

Figure 4:
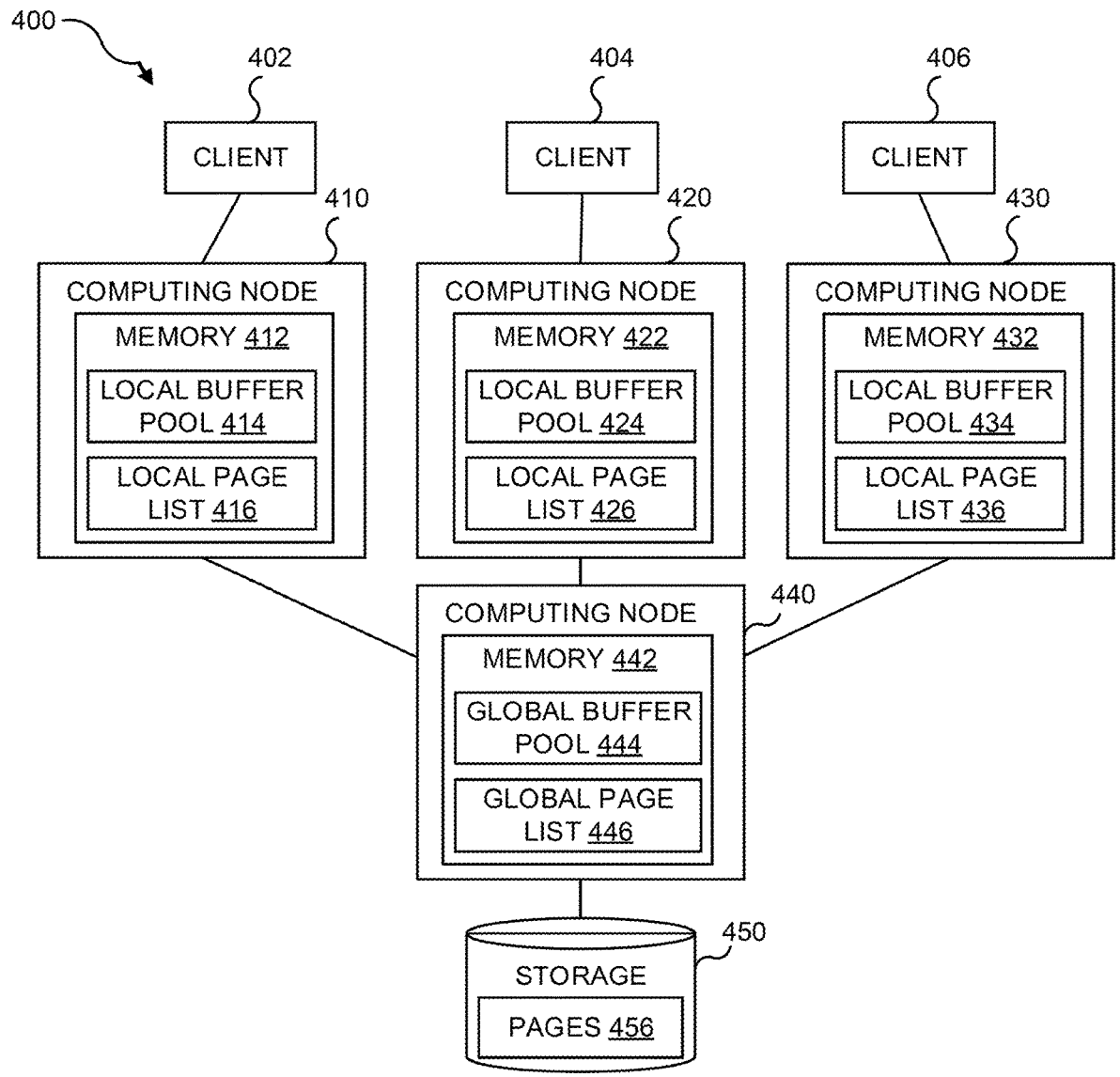
FIG. 4 shows an exemplary database system according to an embodiment of the present disclosure.

With reference now to FIG. 4, FIG. 4 shows an exemplary database system 400 according to an embodiment of the present disclosure. As shown, the database system includes clients 402, 404, and 406, computing nodes 410, 420, 430, and 440, and a storage 450. These components may be coupled together using one or more networks, such as a local area network, or a wide area network. In addition, these components may communicate with each other using known protocols. It should be noted that three clients and three computing nodes are illustrated here by way of example, and an actual database system may include any appropriate number of clients and computing nodes.

According to some embodiments of the disclosure, each of the clients 402, 404, and 406 may be implemented on a personal computer, workstation, or terminal. According to some embodiments of the disclosure, each of the clients 402, 404, and 406 may run an application, such as a web browser, that may be invoked by a user to access a database that is managed by the computing nodes. Although it is shown that the client 402 is in communication with the computing node 410, the client 404 is in communication with the computing node 420 and the client 406 is in communication with the computing node 430 for simplicity, it should be noted that the communication between the clients and the computing nodes may be performed in any appropriate manner. For example, two or more clients may communicate with the same computing node, or one client may communicate with two or more computing nodes at the same time, which is not limited herein.

The computing nodes 410, 420, 430, and 440 may manage access to a common database. For example, each of the computing nodes may be a server or a virtual machine. As shown, the computing node 410 may include a memory 412, which may include a local buffer pool 414 and a local page list 416. The memory 412 may include any kind of volatile storage medium. The local buffer pool 414 may be configured to store one or more pages obtained from the storage 450 or the global buffer pool 444. It will be appreciated that the computing nodes 410, 420, and 430 can directly access data pages in the storage 450, although the connection therebetween is not shown.

The local page list 416 may be configured to record information associated with page access. According to some embodiments of the disclosure, the local page list 416 may comprise at least one entry selected from a group consisting of: a resource name including Database ID (DBID), Object ID (OBID), piece number and page number; a change-bit that indicates whether a page has been changed; a reference-bit that indicates whether a reference signal has been processed; a data-bit that indicates whether a page has been cached, or a cast-out lock that indicates a cast-out state of a page. According to some embodiments of the disclosure, the resource name may include 16 bytes. According to some embodiments of the disclosure, the change-bit may be "1", if the corresponding page is changed in the computing node, i.e., the page in the computing node is more recent than the corresponding page in the storage 450; and the change-bit may be "0" if the corresponding page is not cached or cached but not changed. Note that, if the change-bit is "0" and the cast-out lock indicates that cast-out is being done, this may indicate that the corresponding page is changed. According to some embodiments of the disclosure, the reference bit may be "1", if a reference signal has been processed; and the reference bit may be "0" if a reference signal has not been processed. If the reference bit for a page has been "0" for a predetermined time, the page may be a candidate for replacement, for example when a least recently used (LRU) page replacement algorithm is adopted. According to some embodiments of the disclosure, the data-bit may be "1", if a corresponding page has been cached; and the data-bit may be "0" if a corresponding page has not been cached. According to some embodiments of the disclosure, the cast-out lock may be "0", if a corresponding page is not locked for cast-out; and the cast-out lock being "s" may indicate that the corresponding page is locked and cast-out is being done by a computing node with an identifier "s" (i.e., "s" is the identifier of the computing node). It should be noted that the local page list 416 may include any other information on pages. For example, it may include a cast-out class, which indicates a cast-out class for a corresponding page, or a time stamp, which is updated during unlock periods for cast-out. According to some embodiments of the disclosure, the local page list 416 may be implemented by one or more arrays, each of which may include one kind of information associated with page access for the pages.

The computing node 420 may include a memory 422, which may include a local buffer pool 424 and a local page list 426, and the computing node 430 may include a memory 432, which may include a local buffer pool 434 and a local page list 436. The local buffer pools 424 and 434 are similar to the local buffer pool 414, and the local page lists 426 and 436 are similar to the local page list 416, the description of which is not repeated here.

The computing nodes 410, 420, and 430 may communicate with a computing node 440. The computing node 440 may include a memory 442, which may include a global buffer pool 444 and a global page list 446. For example, the computing node 440 may be a master data node. It should be noted that the computing nodes 410, 420, 430, and 440 may include any other components, such as a processing unit. The global buffer pool 444 may be configured to store one or more pages obtained from the storage 450 or the local buffer pools 414, 424, and 434. Each of the computing nodes 410, 420, and 430 may write information associated with page access into the global page list 446. According to some embodiments of the disclosure, the global page list 446 may comprise at least one entry selected from a group consisting of: a resource name including Database ID (DBID), Object ID (OBID), piece number and page number; a change-bit that indicates whether a page has been changed; a reference-bit that indicates whether a reference signal has been processed; a data-bit that indicates whether a page has been cached, or a cast-out lock that indicates a cast-out state of a page. The definition of the entries may be similar to those described above with respect to the local page list 416. It should be noted that the global page list 446 may include any other information on pages. For example, it may include a cast-out class, which indicates a cast-out class for a corresponding page, or a time stamp, which is updated during unlock periods for cast-out. According to some embodiments of the disclosure, the global page list 446 may be implemented by one or more arrays, each of which may include one kind of information associated with page access for the pages. According to some embodiments of the disclosure, the global page list 446 may not contain every item in the local page lists 416, 426, and 436. Each of the computing nodes 410, 420, and 430 may write part of the page access information in its local page list into the global page list 446, depending on the default configuration or communication between the computing nodes. For example, the computing node 440 may require the computing nodes 410, 420, and 430 not to write an entry that imposes little impact on the decision regarding prefetching or that does not vary frequently during a certain period of time. By omitting information associated with less important page access, storage space in the global page list 446 may be saved.

The computing node 440, such as one or more processing units of the computing node 440 (not shown), may obtain shared information associated with page access in the global page list 446, and determine whether to prefetch a number of pages into the global buffer pool 444 based at least on the shared information associated with page access. According to some embodiments of the disclosure, at least one of the computing nodes 410, 420, and 430 may retrieve shared information associated with page access in the global page list 446 and determine whether to perform prefetching based at least on the shared information associated with page access. According to some embodiments of the disclosure, the computing nodes 410, 420, and 430 may obtain pages directly from the storage 450 and cache the pages in their corresponding local buffer pools. According to some embodiments of the disclosure, one of the computing nodes 410, 420, and 430 may send a message to the computing node 440 to request the computing node 440 to obtain pages from the storage 450. The pages will be cached in the global buffer pool 444 first and then sent to the requesting computing node and cached in the local buffer pool of the requesting computing node. Note that transferring pages between one of the local buffer pools 414, 424, and 434 and the global buffer pool 444 would not incur significant latency, compared to reading the pages from the storage 450.

According to some embodiments of the disclosure, the shared information associated with page access in the global page list 446 may include information associated with page access from computing nodes 410, 420, and 430. For example, the shared information associated with page access may be generated by aggregating (such as combining, summing, or joining) information associated with page access from computing nodes 410, 420, and 430. Thereby, the computing node 440 knows the status of caching and accessing the pages from a global point of view. According to some embodiments of the disclosure, the information associated with page access may be written into the global page list 446 periodically or in response to a change in the information associated with page access in relation to a predetermined page range. The predetermined page range may be associated with another computing node. For example, the computing node 420 may be interested in information associated with page access for pages 16-31, and it may notify the computing node 440 of its interest in this page range. Then, if the computing node 410 updates information associated with page access for pages 16-31 due to operations such as page caching, page changing, or the like, the computing node 410 may write the updated information associated with page access into the global page list 446. The computing node 440 may update the prefetching strategy based at least on the updated shared information associated with page access or provide the updated shared information associated with page access to the computing node 420, which may update the prefetching strategy based at least on the updated shared information associated with page access instead. Alternatively, the computing node 420 may check the global page list 446 periodically for changes in the shared information associated with page access in relation to pages 16-31. Although a centralized scenario is introduced above where the computing nodes 410, 420, and 430 all communicate with the computing node 440, it should be noted that the disclosure is also applicable to a distributed scenario. For example, if P2P communication among the computing nodes 410, 420, and 430 is supported, the computing nodes 410, 420, and 430 may directly exchange at least some of the information associated with page access, thereby reducing the workload of the computing node 440.

The storage 450 may include any kind of non-volatile storage medium and may be configured to store pages 456. A number of pages may be prefetched at one time. The maximum number of pages that can be prefetched at one time may depend on the allocated space for the global buffer pool 444 (or the local buffer pools 414, 424, and 434) or any other factors. According to some embodiments of the disclosure, the number of pages to be prefetched may be adjusted based on the current hit rate of the global buffer pool 444. For example, if the hit rate is above a predetermined threshold, the number of pages to be prefetched may be increased (e.g., doubled). Otherwise, the number of pages to be prefetched may be decreased (e.g., reduced by half). According to some embodiments of the disclosure, determining whether to prefetch the number of pages into the global buffer pool 444 may be based on a sequential prefetching method. The disclosure is not limited herein, and any appropriate prefetching method may be combined with the database system 400 according to embodiments of the disclosure. By leveraging shared information associated with page access in the global page list 446, the prefetching methods can take global page access information into account and make decisions on prefetching based on information from several computing nodes accessing the same database. Taking the sequential prefetching method as an example, according to some embodiments of the disclosure, determining whether to prefetch a number of pages into the global buffer pool 444 based at least on shared information associated with page access in the global page list 446 may comprise: in response to the shared information associated with page access in the global page list 446 indicating that pages are accessed in a near sequential fashion, determining to prefetch the number of pages into the global buffer pool 444; and in response to the shared information associated with page access in the global page list 446 indicating that pages are not accessed in a near sequential fashion, determining not to perform prefetching.

The sequential prefetching method according to some embodiments of the disclosure will be described below in more detail with respect to FIGS. 5A-5D.

FIGS. 5A-5D are exemplary diagrams showing how to manage prefetching of pages based at least on shared information associated with page access according to an embodiment of the present disclosure. As shown, a storage 502 may store pages in a database system. FIGS. 5A-5D only show the pages that are currently accessed for simplicity. It will be appreciated that the storage 502 may store much more pages than those illustrated. The storage 502 may be similar to the storage 450 in FIG. 4. Next, FIGS. 5A-5D will be described in more detail by referring to FIG. 4.

Figure 5A:
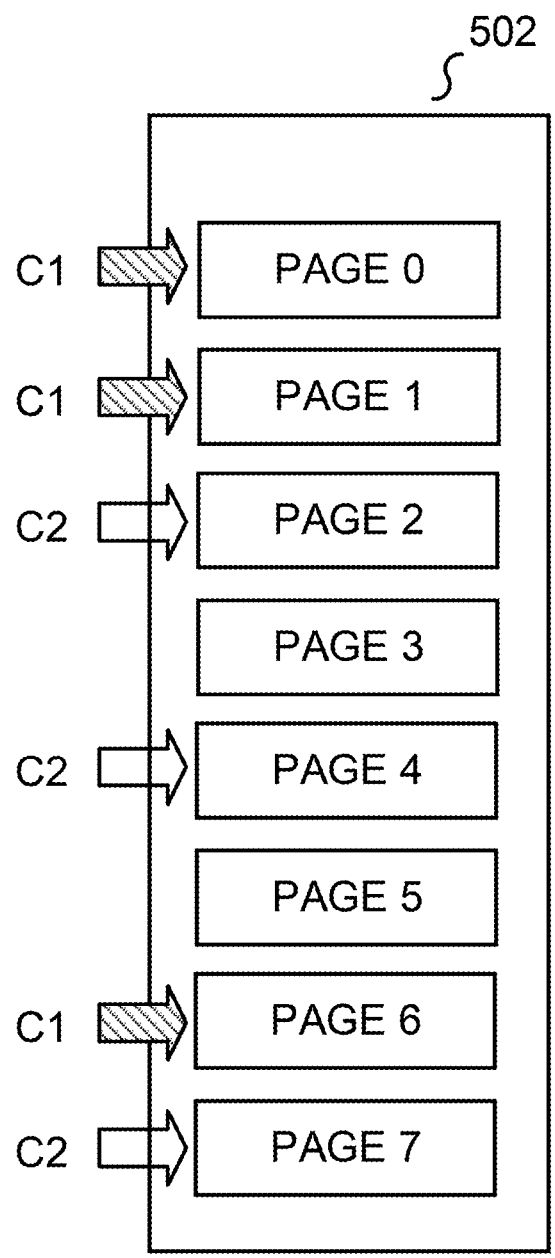
FIGS. 5A-5D are exemplary diagrams showing how to manage prefetching of pages based at least on shared information associated with page access according to an embodiment of the present disclosure.

As shown in FIG. 5A, a client c1 obtains page 0 from the storage 502. The client c1 may be a client that runs an application to access the database in storage 502, such as the client 402 in FIG. 4. Then, the client c1 obtains page 1 from the storage 502. It should be noted that these operations may be managed by one or more computing nodes, such as computing nodes 410, 420, 430, and 440 in FIG. 4. Another client c2 obtains page 2 from the storage 502. The client c2 may be another client that accesses the same database as the client c1, such as the client 404 in FIG. 4. Although page requests from only two clients are depicted in FIGS. 5A-5D, it will be appreciated that more clients may access the same database concurrently. Afterward, the client c2 obtains pages 4 and 7 from the storage 502 and the client c1 obtains page 6 from the storage 502. Although it is shown that the pages are accessed sequentially for simplicity, it should be noted that the pages may also be accessed in any sequence. For example, the client c1 may access page 0 and page 6, and then access page 1. The access sequence is not limited herein. The information associated with page access may be recorded by the respective one or more computing nodes and written into a global page list, such as the global page list 446 in FIG. 4.

As discussed above, determining whether to prefetch a number of pages into the global buffer pool may be based at least on shared information associated with page access in the global page list, and the determining may comprise: in response to the shared information associated with page access indicating that pages are accessed in a near sequential fashion, determining to prefetch the number of pages into the global buffer pool; and in response to the shared information associated with page access indicating that pages are not accessed in a near sequential fashion, determining not to perform prefetching. According to some embodiments of the disclosure, in the sequential prefetching method, the pages that are accessed are constantly monitored, and if near sequential access is determined, the prefetching mechanism may be turned on. According to some embodiments of the disclosure, if the number of pages that are page sequential to one another in the last predetermined number of pages accessed by clients is above or equal to a page threshold, it is determined that the pages are accessed in a near sequential fashion. For example, if the predetermined number is 8, (i.e., the last 8 pages accessed by clients are tracked) and the page threshold is 4, then it is determined that the pages are accessed in a near sequential fashion in response to more than 4 out of the last 8 pages accessed by clients being page sequential to one another. Correspondingly, it is determined that the pages are not accessed in a near sequential fashion in response to less than 4 out of the last 8 pages accessed by clients being page sequential to one another. For example, assuming that the number of pages that can be prefetched at one time is P, and let Page X denote the most recent page that was accessed, and Page Y denote the page accessed by the next request. If Page Y lies within Page X+P/2 pages, i.e., Page Y is within P/2 pages of Page X in the forward direction, it may be determined that Page Y is page sequential to Page X.

Figure 5B:
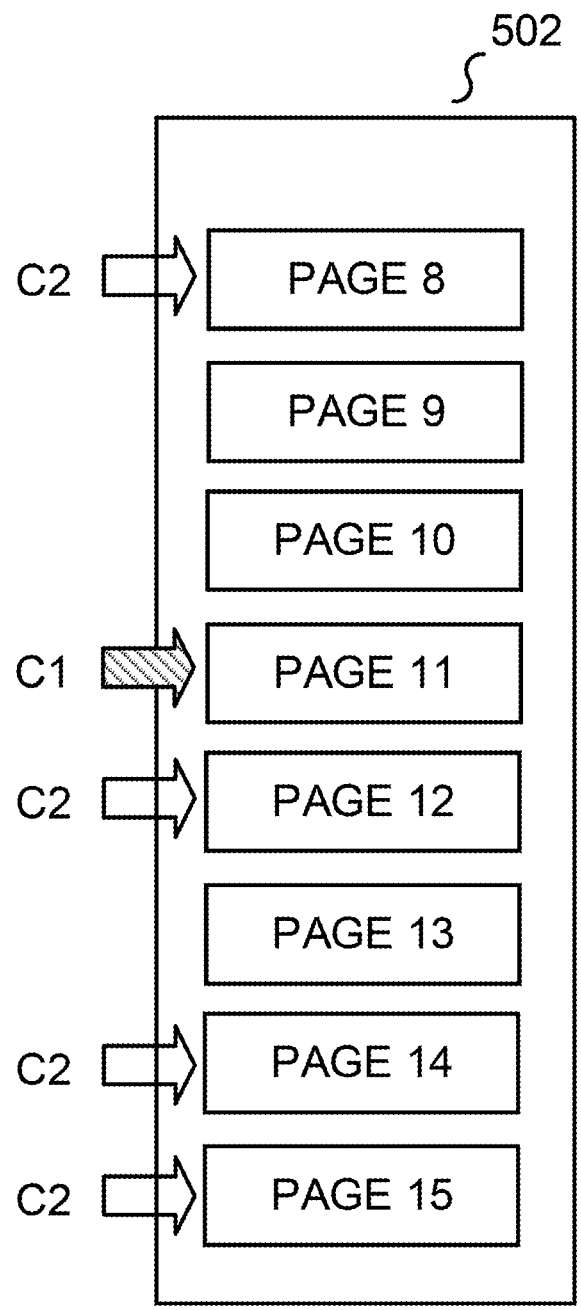
Figure 5C:
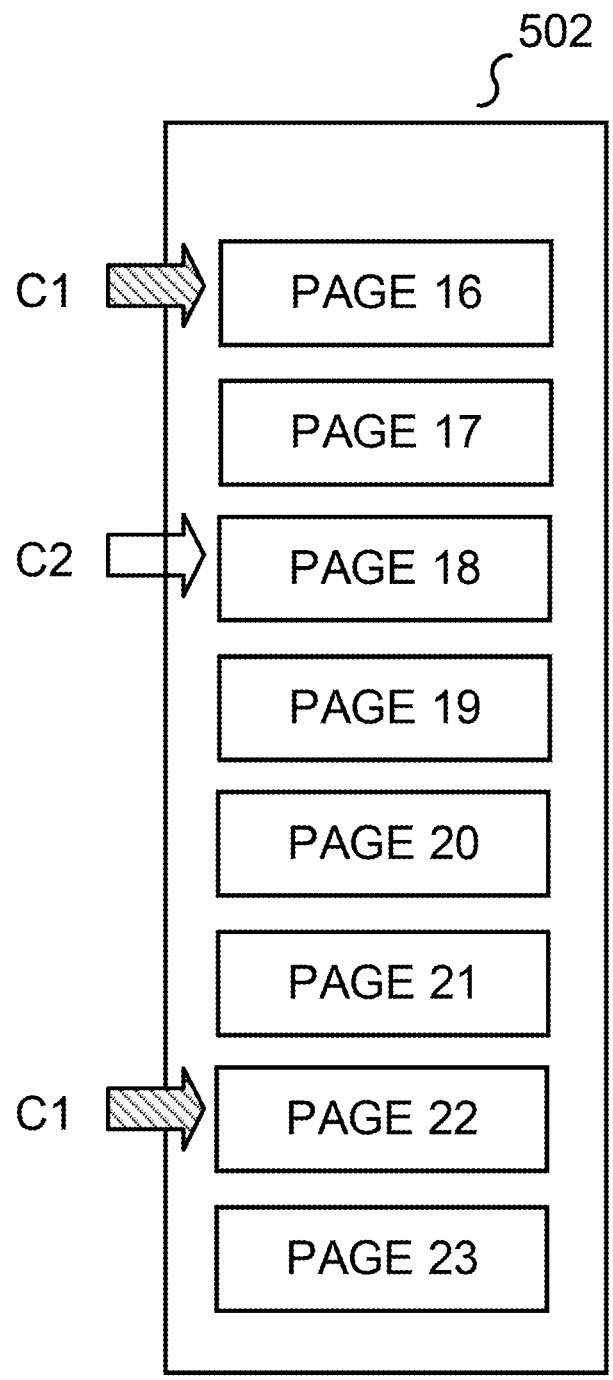
Figure 5D:
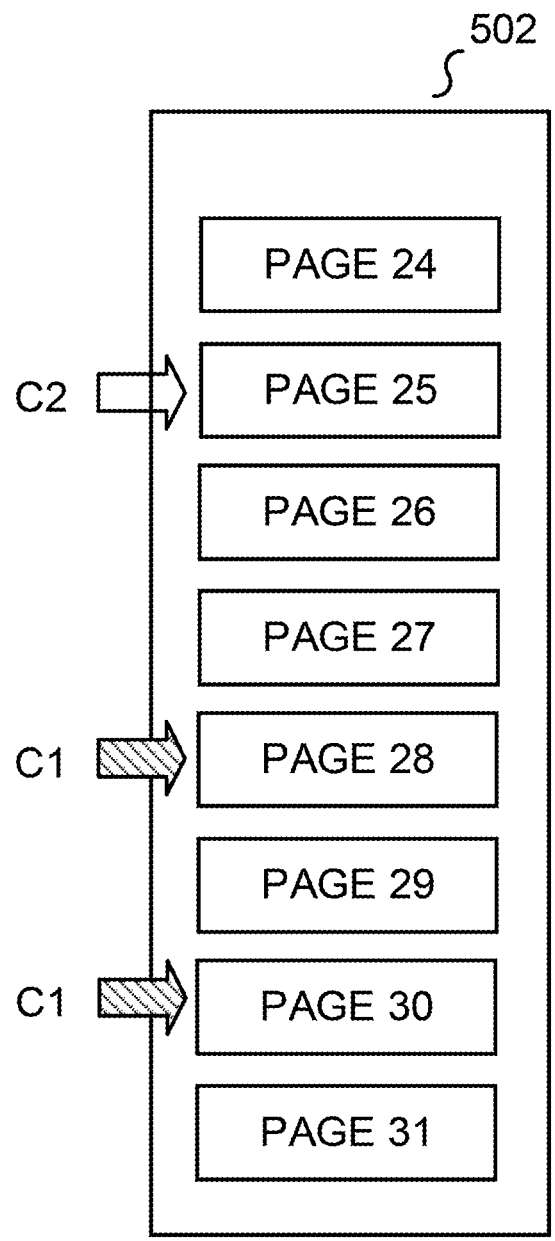

Now referring back to FIG. 5A, for example, assuming that P=8, if Page Y is within 4 pages of Page X in the forward direction, Page Y is page sequential to Page X. It should be noted that P can be any other appropriate number, such as 16, 32, or the like. Thus, it can be determined that, among the pages accessed by c1, page 1 is page sequential to page 0, but page 6 is not page sequential to page 1. As shown in FIG. 5B, the client c2 then obtains page 8, the client c1 obtains page 11, and the client c2 obtains pages 12, 14, and 15 from the storage 502. Thus, it can be determined that page 11 accessed by c1 is not page sequential to page 6. As shown in FIG. 5C, the client c1 obtains page 16, the client c2 obtains page 18, and the client c1 obtains page 22 from the storage 502. Similarly, it can be determined that page 16 is not page sequential to page 11, and page 22 is not page sequential to page 16. As shown in FIG. 5D, the client c2 obtains page 25, the client c1 obtains pages 28 and 30 from the storage 502. Similarly, it can be determined that page 28 is not page sequential to page 22, but page 30 is page sequential to page 28. Thus, if only the page access information from the client c1 is taken into consideration, whereas 5 out of 8 pages accessed by the client c1 are not page sequential to one another, i.e., only 3 out of 8 pages are page sequential to one another, it may be determined that the pages are not accessed in a near sequential fashion and thus, prefetching may not be performed. However, according to some embodiments of the disclosure, determining whether to perform prefetching may be based at least on shared information associated with page access in the global page list. Thus, not only page access information from the client c1 but also page access information from the client c2 may be considered. It may be determined that the pages that have been accessed are all page sequential to one another. Therefore, it may be determined that the pages are accessed in a near sequential fashion and thus prefetching may be performed. In response to this determination, a computing node managing the database system (such as the computing node 440 in FIG. 4) may prefetch pages 32-39 into its global buffer pool (such as the global buffer pool 444 in FIG. 4) and the other computing nodes serving clients' requests (such as the computing nodes 410, 420 and 430) may directly obtain one or more pages from the global buffer pool. The shared information associated with page access may be constantly monitored and the prefetching mechanisms may be dynamically adjusted. By utilizing global page access information, prefetching of pages may be managed in a more precise and efficient manner, and database performance may be improved.

According to some embodiments of the disclosure, the number of pages P and the page threshold may be adjusted. For example, in response to determining that pages are not accessed in a near sequential fashion, the number of pages that can be prefetched at one time, P, may be reduced (e.g., by a half), to see whether the page access pattern meets the updated criteria. If the updated criteria are met, i.e., the pages are determined as being accessed in a near sequential fashion under the updated criteria, prefetching may continue to be performed; otherwise, P may be further reduced. If P becomes lower than a predefined value (e.g., 4), prefetching may be turned off. According to some embodiments of the disclosure, in response to determining that pages are accessed in a near sequential fashion, the number of pages that can be prefetched at one time, P, may be increased (e.g., doubled), to prefetch more pages at one time, thereby reducing I/O overhead. According to some embodiments of the disclosure, the page threshold can be adjusted. For example, in response to determining that pages are not accessed in a near sequential fashion, the page threshold may be reduced (e.g., by 1), to lower the requirement for the ratio of pages that are page sequential to one another to the recently accessed pages. If the updated criteria are met, i.e., the pages are determined as being accessed in a near sequential fashion under the updated criteria, prefetching may continue to be performed; otherwise, the page threshold may be further reduced. If the page threshold becomes lower than a predefined value (e.g., 2), prefetching may be turned off. Thus, by dynamically adjusting the requirements for near sequential access, management of prefetching of pages may be more flexible and efficient.

Figure 6:
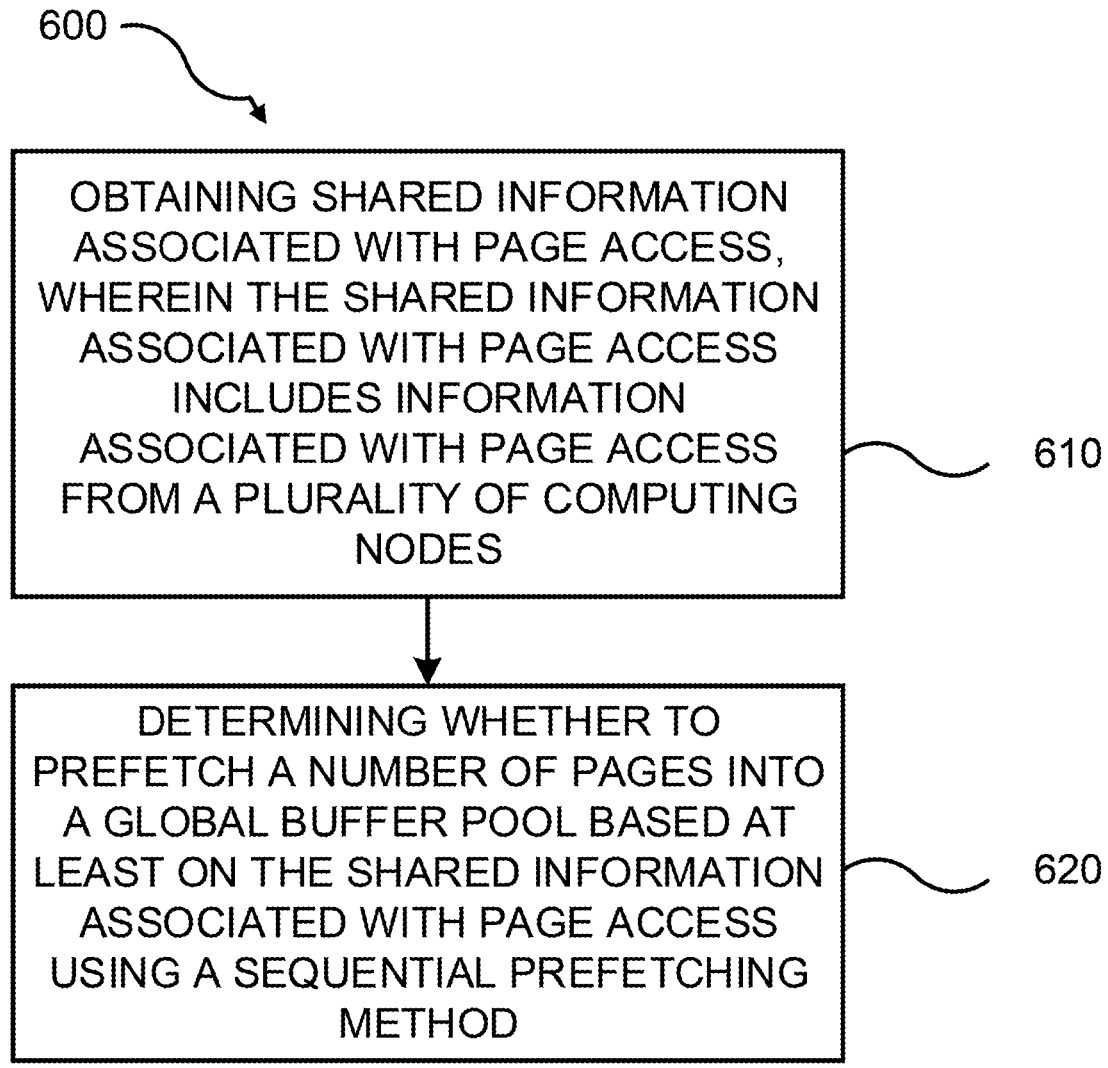
FIG. 6 is a flow chart showing an exemplary method for managing prefetching of pages in a database system according to an embodiment of the present disclosure.

FIG. 6 is a flow chart showing an exemplary method 600 for managing prefetching of pages in a database system according to an embodiment of the present disclosure.

At step 610, the method 600 may include obtaining shared information associated with page access, wherein the shared information associated with page access includes information associated with page access from a plurality of computing nodes (such as the computing nodes 410, 420, 430, and 440 in FIG. 4). Step 610 may be performed by one or more processing units of a computing node (such as one of the computing nodes 410, 420, 430, and 440 in FIG. 4) in a database system. According to some embodiments of the disclosure, the information associated with page access may be recorded by each of the plurality of computing nodes and written into the global page list periodically or in response to a change in the information associated with page access in relation to a predetermined page range.

At step 620, the method 600 may include determining whether to prefetch a number of pages into a global buffer pool based at least on the shared information associated with page access using a sequential prefetching method. According to some embodiments of the disclosure, the shared information associated with page access is stored in a global page list. According to some embodiments of the disclosure, the number of pages may be adjusted based on the current hit rate of the global buffer pool. According to some embodiments of the disclosure, the global page list may comprise at least one entry selected from a group consisting of: a resource name including Database ID (DBID), Object ID (OBID), piece number and page number; a change-bit that indicates whether a page has been changed; a reference-bit that indicates whether a reference signal has been processed; a data-bit that indicates whether a page has been cached, or a cast-out lock that indicates a cast-out state of a page. According to some embodiments of the disclosure, determining whether to prefetch a number of pages into a global buffer pool based at least on the shared information associated with page access using a sequential prefetching method may comprise: in response to the shared information associated with page access indicating that pages are accessed in a near sequential fashion, determining to prefetch the number of pages into the global buffer pool. According to some embodiments of the disclosure, determining whether to prefetch a number of pages into a global buffer pool based at least on the shared information associated with page access using a sequential prefetching method may comprise: in response to the shared information associated with page access indicating that pages are not accessed in a near sequential fashion, determining not to perform prefetching.

It should be noted that the processing of the method 600 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to bring about a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining, by one or more processing units, shared information associated with page access, wherein the shared information associated with the page access includes information associated with the page access from a plurality of computing nodes, and wherein the information associated with the page access i) is recorded by each of the plurality of computing nodes and ii) written into a global page list periodically and in response to a change, in relation to a predetermined page range, in the information associated with the page access;
    determining, by the one or more processing units, whether to prefetch a number of pages into a global buffer pool based at least on the shared information associated with the page access, wherein the shared information associated with the page access indicates whether the number of pages are accessed in a near sequential fashion;
    in response to determining that the number of pages are not accessed in the near sequential fashion, reducing the number of pages that can be prefetched at one time; and
    in response to determining that the reduced number of pages being prefetched becomes lower than a predefined value, turning off prefetching.

2. The method of claim 1, wherein the number of pages, to prefetch into the global buffer pool, is adjusted based on a current hit rate of the global buffer pool.

3. The method of claim 1, wherein the global page list comprises at least one entry selected from a group consisting of:
    a resource name including Database ID (DBID), Object ID (OBID), piece number and page number, a change-bit that indicates whether a page has been changed, a reference-bit that indicates whether a reference signal has been processed, a data-bit that indicates whether the page has been cached, or a cast-out lock that indicates a cast-out state of the page.

4. The method of claim 1, further comprising:
    determining, by the one or more processing units, whether to prefetch a second number of pages into the global buffer pool based at least on the shared information associated with the page access; and
    in response to the shared information associated with the page access indicating that the second number of pages are accessed in the near sequential fashion, determining, by the one or more processing units, to prefetch the second number of pages into the global buffer pool.

5. The method of claim 1, wherein determining, that the number of pages are not accessed in the near sequential fashion, is based on the shared information associated with the page access.

6. A computing system, comprising:
    a processor;
    a computer-readable memory unit coupled to the processor, the memory unit comprising instructions that, when executed by the processor, perform actions of:
    obtaining shared information associated with page access, wherein the shared information associated with the page access includes information associated with the page access from a plurality of computing nodes, and wherein the information associated with the page access i) is recorded by each of the plurality of computing nodes and ii) written into a global page list periodically and in response to a change, in relation to a predetermined page range, in the information associated with the page access;

determining, by the one or more processing units, whether to prefetch a number of pages into a global buffer pool based at least on the shared information associated with the page access, wherein the shared information associated with the page access indicates whether the number of pages are accessed in a near sequential fashion;

in response to determining that the number of pages are not accessed in the near sequential fashion, reducing the number of pages that can be prefetched at one time; and in response to determining that the reduced number of pages being prefetched becomes lower than a predefined value, turning off prefetching.

7. The computing system of claim 6, wherein the number of pages, to prefetch into the global buffer pool, is adjusted based on a current hit rate of the global buffer pool.

8. The computing system of claim 6, wherein the global page list comprises at least one entry selected from a group consisting of:
 a resource name including Database ID (DBID), Object ID (OBID), piece number and page number, a change-bit that indicates whether a page has been changed, a reference-bit that indicates whether a reference signal has been processed, a data-bit that indicates whether the page has been cached, or a cast-out lock that indicates a cast-out state of the page.

9. The computing system of claim 6, further comprising:
 determining whether to prefetch a second number of pages into the global buffer pool based at least on the shared information associated with the page access; and
 in response to the shared information associated with the page access indicating that the second number of pages are accessed in the near sequential fashion, determining to prefetch the second number of pages into the global buffer pool.

10. The computing system of claim 6, wherein determining, that the number of pages are not accessed in the near sequential fashion, is based on the shared information associated with the page access.

11. A computer program product, comprising a computer readable storage medium having program instructions embodied therewith, the program instructions executable by a processor to induce the processor to perform actions of:
 obtaining shared information associated with page access, wherein the shared information associated with the page access includes information associated with the page access from a plurality of computing nodes, and wherein the information associated with the page access i) is recorded by each of the plurality of computing nodes and ii) written into a global page list periodically and in response to a change, in relation to a predetermined page range, in the information associated with the page access;

determining, by the one or more processing units, whether to prefetch a number of pages into a global buffer pool based at least on the shared information associated with the page access, wherein the shared information associated with the page access indicates whether the number of pages are accessed in a near sequential fashion;

in response to determining that the number of pages are not accessed in the near sequential fashion, reducing the number of pages that can be prefetched at one time; and in response to determining that the reduced number of pages being prefetched becomes lower than a predefined value, turning off prefetching.

12. The computer program product of claim 11, wherein the number of pages, to prefetch into the global buffer pool, is adjusted based on a current hit rate of the global buffer pool.

13. The computer program product of claim 11, wherein the global page list comprises at least one entry selected from a group consisting of:
 a resource name including Database ID (DBID), Object ID (OBID), piece number and page number, a change-bit that indicates whether a page has been changed, a reference-bit that indicates whether a reference signal has been processed, a data-bit that indicates whether the page has been cached, or a cast-out lock that indicates a cast-out state of the page.

14. The computer program product of claim 11, further comprising:
 determining whether to prefetch a second number of pages into the global buffer pool based at least on the shared information associated with the page access; and
 in response to the shared information associated with the page access indicating that the second number of pages are accessed in the near sequential fashion, determining to prefetch the second number of pages into the global buffer pool.

15. The computer program product of claim 11, wherein determining, that the number of pages are not accessed in the near sequential fashion, is based on the shared information associated with the page access.

\* \* \* \* \*